United States Patent
Shi et al.

(10) Patent No.: US 10,296,426 B2
(45) Date of Patent: May 21, 2019

(54) STORAGE CONTROL OF STORAGE MEDIA SUBJECT TO WRITE AMPLIFICATION EFFECTS

(71) Applicant: International Business Machines Corporation, Armonk, NY (US)

(72) Inventors: Yong Hong Shi, Shanghai (CN); Qian Su, Shanghai (CN); Yu Sun, Nanjing (CN); Wei You, Shanghai (CN)

(73) Assignee: International Business Machines Corporation, Armonk, NY (US)

(*) Notice: Subject to any disclaimer, the term of this patent is extended or adjusted under 35 U.S.C. 154(b) by 143 days.

(21) Appl. No.: 15/622,108

(22) Filed: Jun. 14, 2017

(65) Prior Publication Data

US 2017/0277608 A1 Sep. 28, 2017

Related U.S. Application Data

(63) Continuation of application No. 14/685,630, filed on Apr. 14, 2015, now Pat. No. 9,996,433.

(30) Foreign Application Priority Data

Apr. 29, 2014 (CN) .......................... 2014 1 0178087

(51) Int. Cl.
*G06F 11/00* (2006.01)
*G06F 11/20* (2006.01)
(Continued)

(52) U.S. Cl.
CPC ...... *G06F 11/2038* (2013.01); *G06F 11/1076* (2013.01); *G06F 11/1451* (2013.01);
(Continued)

(58) Field of Classification Search
CPC ................................................. G06F 11/2038
(Continued)

(56) References Cited

U.S. PATENT DOCUMENTS 6,223,252 B1 4/2001 Bandera et al.
8,402,242 B2 3/2013 Hu et al.
(Continued)

FOREIGN PATENT DOCUMENTS

CN 101419842 A 4/2009
CN 101719050 A 6/2010
(Continued)

OTHER PUBLICATIONS

IBM, "List of IBM Patents or Patent Applications Treated As Related", Appendix P, dated Jun. 19, 2017, 2 pages.
(Continued)

*Primary Examiner* — Christopher S McCarthy
(74) *Attorney, Agent, or Firm* — Noah A. Sharkan; Nicholas L. Cadmus

(57) ABSTRACT

According to one aspect of the present invention, there is provided a method for performing storage control. Member storage media and a hot spare storage medium are identified in a storage system. The member storage media are members of a storage medium array, and the hot spare storage medium is for joining in the storage medium array when a member storage medium fails. Data on a member storage medium having a write amplification effect is migrated to the hot spare storage medium. In the member storage medium having a write amplification effect, an erase operation is performed on a storage medium where the migrated data is located. Embodiments of the present invention can alleviate adverse impact caused by a write amplification effect.

18 Claims, 7 Drawing Sheets

(51) Int. Cl.
  *G06F 11/14* (2006.01)
  *G06F 11/10* (2006.01)
  *G06F 11/16* (2006.01)
(52) U.S. Cl.
  CPC ...... *G06F 11/1464* (2013.01); *G06F 11/1662* (2013.01); *G06F 11/2069* (2013.01); *G06F 11/2094* (2013.01); *G06F 2201/84* (2013.01); *G06F 2211/1059* (2013.01)
(58) Field of Classification Search
  USPC .......................................................... 714/6.2
  See application file for complete search history.

(56) References Cited

U.S. PATENT DOCUMENTS

| | | | |
|---|---|---|---|
| 8,479,080 | B1 | 7/2013 | Shalvi et al. |
| 8,601,311 | B2 | 12/2013 | Horn |
| 8,639,883 | B2 | 1/2014 | Belluomini et al. |
| 8,762,772 | B2 | 6/2014 | Yen et al. |
| 8,812,901 | B2 | 8/2014 | Sheffield, Jr. |
| 9,240,235 | B2 | 1/2016 | Alrod et al. |
| 2006/0041793 | A1 | 2/2006 | Cherian et al. |
| 2009/0300277 | A1 | 12/2009 | Jeddeloh |
| 2010/0017650 | A1 | 1/2010 | Chin et al. |
| 2010/0088485 | A1 | 4/2010 | Ikeda et al. |
| 2011/0029715 | A1 | 2/2011 | Hu et al. |
| 2012/0221784 | A1 | 8/2012 | Ban |
| 2013/0067159 | A1 | 3/2013 | Mehra |
| 2013/0067187 | A1 | 3/2013 | Moss et al. |
| 2013/0173955 | A1 | 7/2013 | Hallak et al. |
| 2013/0232290 | A1 | 9/2013 | Ish et al. |
| 2013/0232292 | A1 | 9/2013 | Bandic et al. |
| 2014/0025887 | A1 | 1/2014 | Kim et al. |
| 2014/0181369 | A1 | 6/2014 | Horn |
| 2014/0208017 | A1 | 7/2014 | Benhase et al. |
| 2016/0179422 | A1 | 6/2016 | Lee |

FOREIGN PATENT DOCUMENTS

| | | |
|---|---|---|
| CN | 102473135 A | 5/2012 |
| CN | 102662606 A | 9/2012 |
| CN | 103617006 A | 3/2014 |
| CN | 105094685 A | 11/2015 |
| WO | 2011153478 A2 | 12/2011 |
| WO | 2012148828 A2 | 11/2012 |
| WO | 2013154804 A1 | 10/2013 |
| WO | 2014105228 A1 | 7/2014 |

OTHER PUBLICATIONS

Chen, Feng, "On Performance Optimization and System Design of Flash Memory Based Solid State Drives in the Storage Hierarchy", Dissertation, Presented in Partial Fulfillment of the Requirements for the Degree Doctor of Philosophy in the Graduate School of The Ohio State University, 2010, pp. ii-128, © Copyright by Feng Chen 2010.

Horn, Robert, Aristos Logic Corporation, Using Hot Spare Disk Drives for Performance Enhancement in a RAID System, An IP.com Prior Art Database Technical Disclosure, IP.com No. 000019208, IP.com Electronic Publication: Sep. 4, 2003, pp. 1-2.

Jeremic et al., "Operating System Support for Dynamic Over-Provisioning of Solid State Drives", SAC 2012, Mar. 26-30, 2012, Riva (Trento), Italy, pp. 1753-1758, Copyright 2012 ACM 978-1-4503-0857-1/12/03.

Seo et al., "RAID-Optimal Data Placement in a Hybrid Solid-State Drive", 2013 IEEE International Conference on Consumer Electronics (ICCE), pp. 651-652, 978-1-4673-1363-61131$31.00, ©2013 IEEE, <http://ieeexplore.ieee.org/xpl/articleDetails.jsp?tp=&arnumber=6487056&searchWithin%3DRAID%26queryText%3DEndurance>.

Sun et al., "SCM Capacity and NAND Over-Provisioning Requirements for SCM/NAND Flash Hybrid Enterprise SSD"pp. 1-4, 978-1-4673-6169-9/13/$31.00, ©2013 IEEE, <http://ieeexplore.ieee.org/xpl/articleDetails.jsp?tp=&arnumber=6582099&searchWithin%3DAll-cold-data+Case%26queryText%3DOver-provisioning>.

"A method to expand SSD cache using hot spare disks", An IP.com Prior Art Database Technical Disclosure, Authors et. al.: Disclosed Anonymously, IP.com No. 000233970, IP.com Electronic Publication: Jan. 6, 2014, pp. 1-3.

"Data Storage System Employing a Hot Spare to Store and Service Accesses to Data Having Lower Associated Wear", U.S. Appl. No. 14/585,886, filed Dec. 30, 2014, pp. 1-50.

"The Why and How of SSD Over Provisioning", White Paper WP004, Oct. 2012, Smart Storage™ Systems, pp. 1-7, retrieved from Internet Archive Wayback machine, Sep. 7, 2013, <http://www.smartstoragesys.com/pdfs/WP004_OverProvisioning_WhyHow.pdf>.

"Write amplification", Wikipedia, the free encyclopedia, retrieved on Feb. 24, 2015, pp. 1-13, this page was last modified on Feb. 7, 2015, <http://en.wikipedia.org/wiki/Write_amplification#Over-provisioning>.

Shi et al., "Storage Control of Storage Media Subject to Write Amplification Effects", U.S. Appl. No. 14/685,630, filed Apr. 14, 2015, 32 pages.

STORAGE CONTROL OF STORAGE MEDIA SUBJECT TO WRITE AMPLIFICATION EFFECTS

FIELD OF THE INVENTION

The present invention relates to computer technology, and more specifically relates to a method and apparatus for storage control.

BACKGROUND

Compared with a traditional hard disk drive (HDD), a solid state disk (SSD) based on the flash memory technology has an advantage of fast speed. However, due to the characteristics of the SSD, the SSD can have an issue of write amplification, which can affect the service life of the SSD.

In an SSD, if new data is required to be written into a storage medium location that already stores data, it is mandatory to first erase that storage medium location to switch it into an idle state before writing new data into that storage medium location. The erase operation must typically be performed in a unit of storage medium blocks. In a typical example, the size of a storage medium block is 256 KB. On the other hand, in an SSD, the minimum unit for allocating a storage medium is called a storage medium page. Typically, the size of a storage medium page is 4 KB. In other words, in the above example, a storage medium block comprises 64 storage medium pages.

For example, one storage medium block in the SSD may be fully written with data, and it may be desired to modify data stored in a certain target storage medium page in that storage medium block. According to the above description, erasing must be first performed before writing of the modified data; however, the erasing can only be performed as to the whole storage medium block. In other words, the data in the whole storage medium block must be read into a buffer; and then the erase operation is performed on the whole storage medium block. Next, the data is modified in the buffer, and the modified data is written back to the storage medium block that has been erased. Accordingly, to modify data on a storage medium page (4 KB), it is not only required to erase and write the storage medium page, but also to erase and write to the other 63 storage medium pages in the whole storage medium block (256 KB) where the storage medium page is located. This is referred to as "write amplification."

SUMMARY

According to one aspect of the present invention, there is provided a method for performing storage control, comprising: identifying member storage media and a hot spare storage medium in a storage system, wherein the member storage media are members of a storage medium array, and the hot spare storage medium is for joining in the storage medium array when a member storage medium fails; migrating data on a member storage medium having a write amplification effect to the hot spare storage medium; and performing, in the member storage medium having a write amplification effect, an erase operation on a storage medium where the migrated data is located.

According to another aspect of the present invention, there is provided an apparatus for performing storage control, comprising: an identifying module configured to identify member storage media and a hot spare storage medium in a storage system, wherein the member storage media are members of a storage medium array, and the hot spare storage medium is for joining in the storage medium array when a member storage medium fails; a migrating module configured to migrate data on a member storage medium having a write amplification effect to the hot spare storage medium; and an erasing module configured to perform, in the member storage medium having a write amplification effect, an erase operation on a storage medium where the migrated data is located.

According to another aspect of the present invention, there is provided a computer program product for performing storage control, the computer program product comprising: one or more computer readable storage media and program instructions stored on the one or more computer readable storage media, the program instructions comprising: program instructions to identify member storage media and a hot spare storage medium in a storage system, wherein the member storage media are members of a storage medium array, and the hot spare storage medium is for joining in the storage medium array when a member storage medium fails; program instructions to migrate data on a member storage medium having a write amplification effect to the hot spare storage medium; and program instructions to perform, in the member storage medium having a write amplification effect, an erase operation on a storage medium where the migrated data is located.

According to the technical solutions of the present invention, adverse impacts brought by the write amplification effect may be reduced.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Embodiments of the present invention recognize a need to reduce write amplification in SSDs, since storage media in SSDs can only be erased and written a limited number of times, and write amplification incurs unnecessary erase and write operations to the storage media.

Some preferable embodiments will be described in more detail with reference to the accompanying drawings, in which preferable embodiments of the present disclosure have been illustrated. However, the present disclosure can be implemented in various manners, and thus should not be construed to be limited to the embodiments disclosed herein. On the contrary, these embodiments are provided for a thorough and complete understanding of the present disclosure, and to completely convey the scope of the present disclosure to those skilled in the art.

Figure 1:
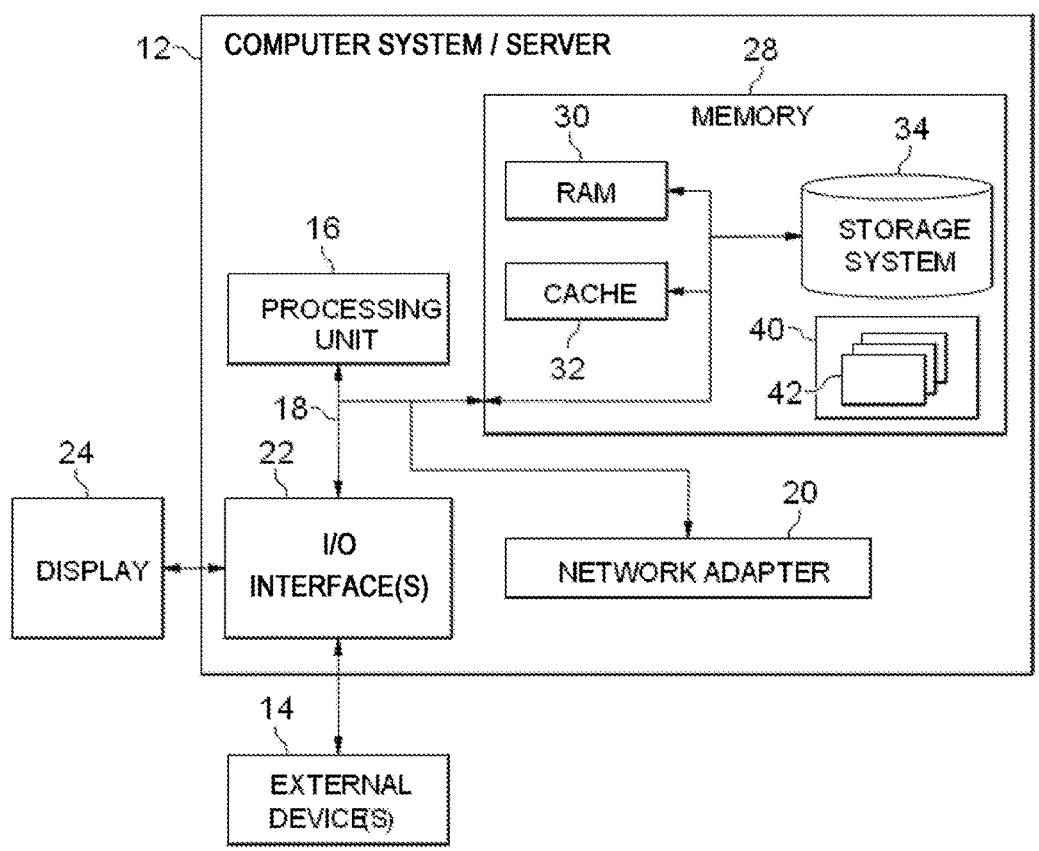
FIG. 1 shows a block diagram of an exemplary computer system/server that is applicable to implement embodiments of the present invention.

Referring now to FIG. 1, in which an exemplary computer system/server 12 applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a memory 28, and a bus 18 that couples various system components, including memory 28, to processing units 16.

Bus 18 represents one or more of any of several types of bus structures, including a memory bus or memory controller, a peripheral bus, an accelerated graphics port, and a processor or local bus using any of a variety of bus architectures. By way of example and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, and removable and non-removable media.

Memory 28 can include computer system readable media in the form of volatile memory, such as random access memory (RAM) 30 and/or cache 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk, such as a CD-ROM, DVD-ROM or other optical media, can be provided. In such instances, each can be connected to bus 18 by one or more data media interfaces. As further depicted and described below, memory 28 may include at least one program product having a set (at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, program data, or some combination thereof, may include an implementation of a networking environment. Program modules 42 generally carry out the functions and/or methodologies of embodiments of the invention, as described herein.

Computer system/server 12 may also communicate with: one or more external devices 14, such as a keyboard, a pointing device, a display 24, etc.; one or more other devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks, such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, data archival storage systems, etc.

An effective method of reducing write amplification involves providing an additional storage medium for directly storing modified data, while labelling the storage medium page where the original data is located as invalid. In this way, it would be unnecessary to perform erase and write operations to the previous storage medium pages and to the storage medium block where the previous storage medium pages are located.

In the discussion below, "logical address" refers to the address processed by an operating system, while "physical address" refers to a specific location on a storage medium. A further assumption is that one logical address and one physical address correspond to one storage medium page. The physical address is transparent to the operating system, and a controller of the SSD is responsible for correspondence between the logical address and the physical address.

When the operating system performs a first time write operation on a logical address to write the first data, the SSD allocates a first physical address to the logical address to store the first data, such that the logical address corresponds to the first physical address. When the operating system performs a second time write operation on the logical address to write second data, the SSD allocates a second physical address to the logical address to store the second data, instead of erasing the first data from the first physical address, before writing the second data into the first physical address. In this way, the physical address corresponding to the logical address becomes the second physical address from the first physical address. The first physical address is identified to be in an invalid state. The first physical address, being identified to be in the invalid state, although it does not correspond to the logical address any longer, is still unavailable for storing new data.

The storage medium in an invalid state still has to be erased first (i.e., changed from the invalid state to an idle state before writing new data into the storage medium). However, the above method may avoid performing an erase operation on the whole storage medium block each time a modification of a storage medium page is required. Performing a one-time erase operation after most storage medium pages in the storage medium block have changed into the invalid state greatly reduces the number of erase operations, thereby alleviating the write amplification effect.

A write amplification issue can be encountered if the data in an SSD is modified when there are no more storage medium pages in an idle state in the SSD. For an operating system, the SSD is expected to be capable of storing data reaching its nominal capacity. For example, if the nominal capacity of the SSD is 400 GB, then the operating system might write data of 400 GB to the SSD. In practice, in order to enable the storage medium pages in the idle state to still remain at the time the data stored in the SSD reaches the nominal volume of the SSD, so as not to incur write amplification due to data modification, the actual capacity of the SSD is often larger than its nominal capability.

It will be appreciated that the greater margin the actual capacity of the SSD has over its nominal capacity, the more advantageous it is to help delay the time of performing the erase operation, such that it is more advantageous to alleviate the write amplification effect in the SSD. An extreme example is that if the actual capacity of the SSD is infinite, the number of storage medium pages in an idle state is also infinite. In such an example, a storage medium page in an idle state will be used for modification of data on the storage medium page, such that the erase operation on a storage medium page in an invalid state can be postponed all along. In this way, no write amplification effect would be incurred.

Figure 2:
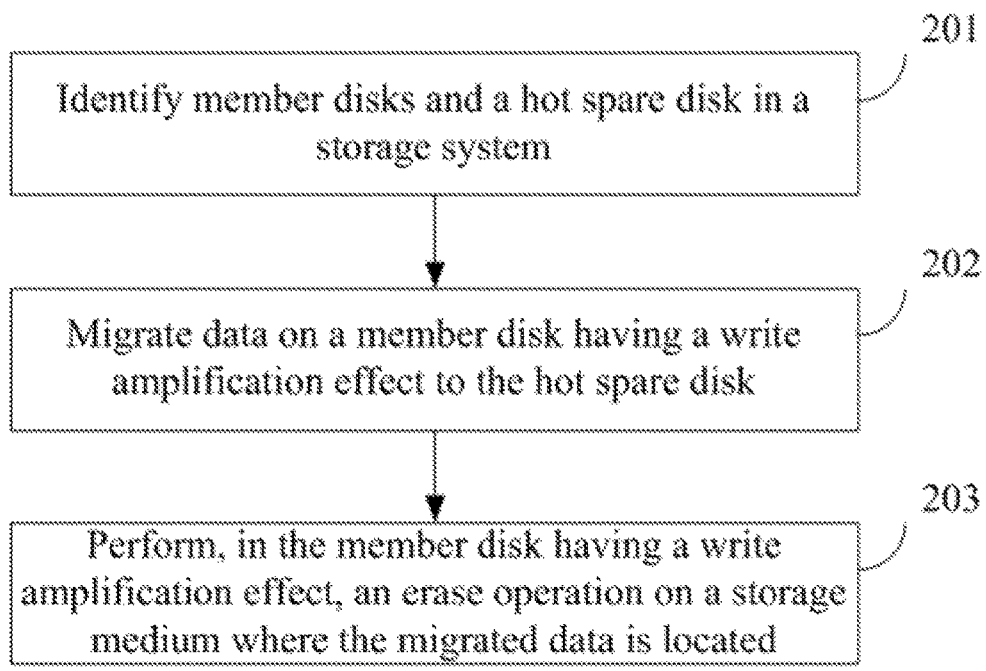
FIG. 2 shows a flow chart of a method for performing storage control, according to an embodiment of the present invention.

FIG. 2 depicts a method for performing storage control, according to an embodiment of the present invention.

At operation 201, member disks and hot spare disks in a storage system are identified, wherein the member disks are members of a disk array, and the hot spare disks are for joining in the disk array when a member disk fails.

In a modern storage system, a disk array is generally used to store data. The disk array comprises a plurality of member disks. In the disk array, data is partitioned into many strips that are deposited on respective member disks. In this way, different data strips may be read/written in parallel from different member disks, so as to enhance the throughput of the storage system. The above functions are basic functions of a disk array.

Data strips from different member disks may be combined into a data stride, and a mutual check is enabled between strips in the same stride. In this way, when any member disk in the array fails, the data on the failing member disk may be recovered with the check from the data on a non-failing member disk. This process is called "data rebuild". A data rebuild-enabled disk array is always provided with a hot spare disk, so as to quickly respond to the member disk failure. When each member disk in the disk array works normally, the hot spare disk is not used for storing data. When a failure occurs, the integrity of the disk array is destroyed. As a response, the hot spare disk joins in the disk array. The data recovered through data rebuild is written into the hot spare disk. In this way, the hot spare disk substitutes for the failing member disk, and forms again an integral array with the non-failing member disk. Afterwards, a new hard disk replaces the failing disk to act as a new hot spare disk.

In practice, common disk array structures that can not only enhance throughput, but also realize data redundancy, include: RAID 01/10, RAID 2, RAID 3, RAID 4, RAID 5, RAID 6, RAID 7, RAID 5E, RAID 5EE, RAID 50, and various combinations thereof. It should be noted that although the technical solutions according to embodiments of the present invention may be described hereinafter with reference to a specific disk array structure, the present invention is not limited to a particular disk array structure. Embodiments of the present invention can be adopted for use in any storage system that has both member disks and a hot spare disk.

In operation 202, data on a member disk having a write amplification effect is migrated on a hot spare disk. Whether there is a write amplification effect depends on characteristics of a storage medium in a hard disk. As stated above, if a storage medium of a hard disk stores data, it is required to erase data before writing new data, and if the minimum unit of the erase is larger than the minimum unit for allocating storage media, then the write amplification effect will occur. An SSD is a typical storage medium having a write amplification effect. Hereinafter, illustration will be made with an SSD as an example.

After the data on member disks is migrated onto a hot spare disk, if the migrated data is required to access, then the storage medium on the hot spare disk, rather than the storage medium originally storing the migrated data on a member disk, will be accessed.

In operation 203, in the member disk having a write amplification effect, an erase operation is performed on the storage medium where the migrated data is located.

In the member disk having a write amplification effect, after the erase operation is done, the storage medium originally storing migrated data becomes a storage medium in an idle state. When the remaining data in the member disk is modified, this part of the storage medium in an idle state may be used to alleviate the write amplification effect in the member disk.

Figure 3A:
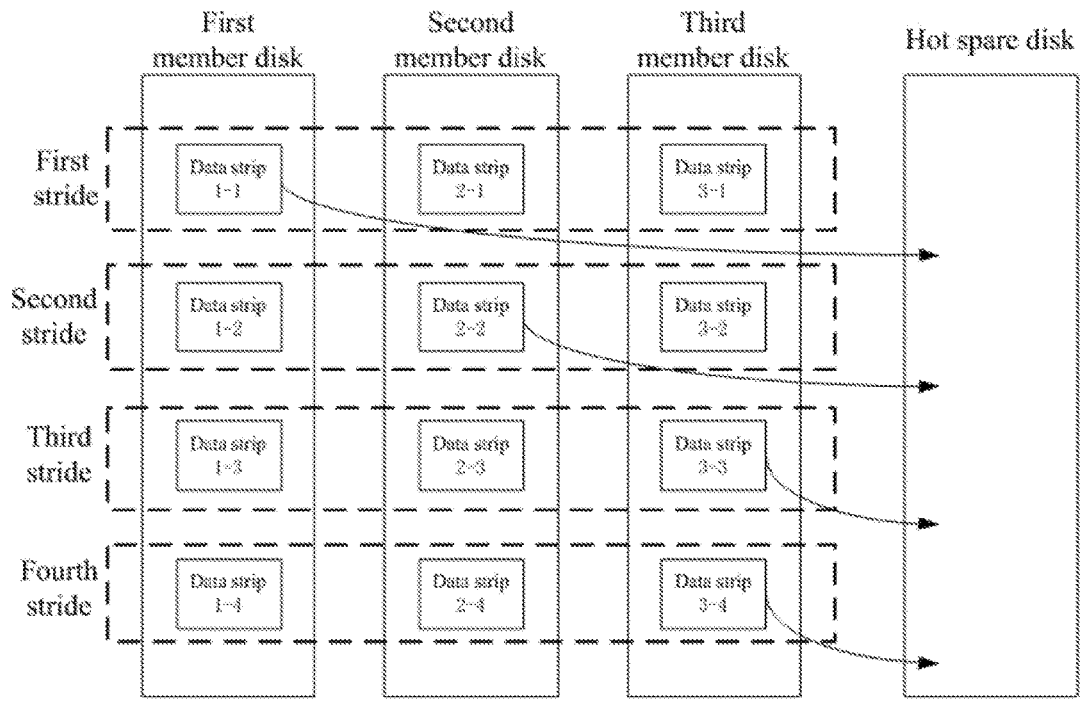
FIGS. 3A and 3B are schematic diagrams of a storage system, according to an embodiment of the present invention.

Hereinafter, illustration is made in combination with FIG. 3A to depict an example of performing storage control. In FIG. 3A, a specific disk array structure, RAID 5, is used to describe embodiments of the present invention. However, as stated above, the present invention is not limited to specific disk array structures. Embodiments of the present invention can be adopted for use in any storage system that has both member disks and a hot spare disk.

As shown in FIG. 3A, a storage system comprises a disk array and a hot spare disk. The disk array comprises three hard disks, which form a RAID 5 structure. According to the RAID 5 specification, three data strips coming from three disks, respectively, are combined into a data stride. For example, data strip 1-1, data strip 2-1, and data strip 3-1 are combined into a first data stride; data strip 1-2, data strip 2-2, and data strip 3-2 are combined into a second data stride. The data strips in each data stride have a redundancy (i.e., when any data strip is lost, the lost data strip may be recovered from other data strips). For example, if the first member disk fails, then data strips 1-1, 1-2, 1-3, and 1-4 will be lost. In this case, data strip 1-1 may be recovered from data strips 2-1 and 3-1; data strip 1-2 may be recovered from data strips 2-2 and 3-2; data strip 1-3 may be recovered from data strips 2-3 and 3-3; and data strip 1-4 may be recovered from data strips 2-4 and 3-4. The recovered data is placed into the hot spare disk, such that the hot spare disk, the second member disk, and the third member disk together form a new disk array.

Figure 3B:
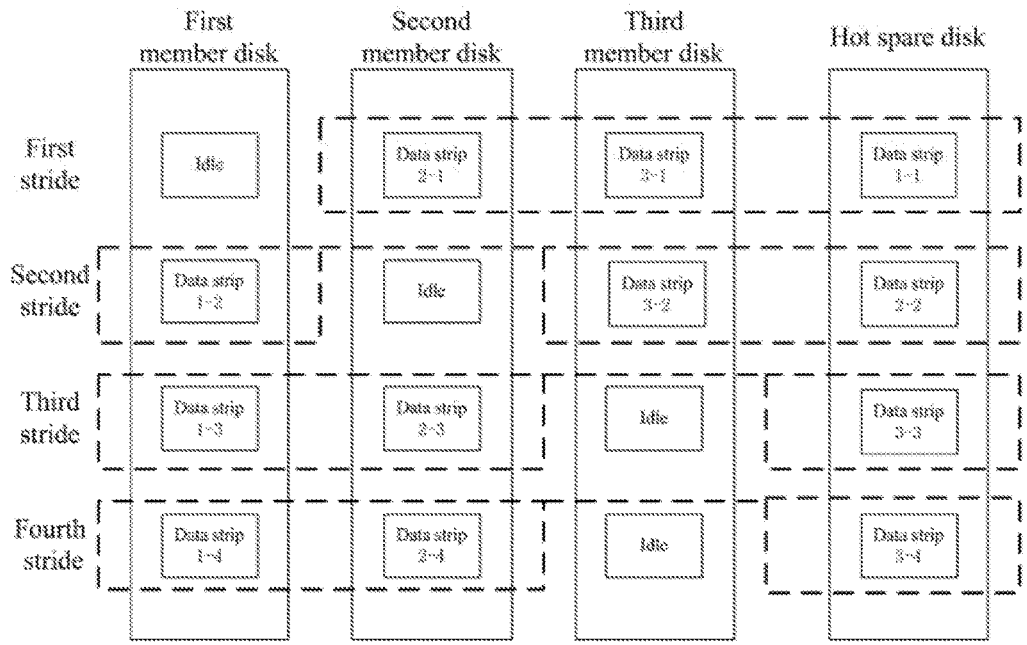

According to the embodiments of the present invention, as shown by arrows in FIG. 3A, data strips 1-1, 2-2, 3-3, and 3-4 in the member disks are migrated into the hot spare disk. Generally speaking, a data stripe comprises a plurality of storage medium blocks. Therefore, after the data strip is migrated into the hot spare disk, an erase operation may be performed on a corresponding storage medium in the member disk, thereby forming a storage medium in an idle state. The storage system after the migrating operation is shown in FIG. 3B. As shown in FIG. 3B, the first data stride only contains data strips on the second member disk, the third member disk, and the hot spare disk, while the second data stride only contains data strips on the first member disk, the third member disk, and the hot spare disk, etc.

According to embodiments of the present invention, the data volume migrated from each member disk has a small variance. For example, a variance threshold may be set to ensure that when performing the migrating, the variance of the data volume migrated from each member disk is smaller than the variance threshold. A further advantage for such a practice is that each member disk can obtain a storage medium in an idle state.

According to one embodiment of the present invention, when data on a member disk having a write amplification effect is migrated on the hot spare disk, a data stride in the disk array should be identified first. As stated above, the data stride contains data strips from different member disks, and mutual checks can be performed between data strips belonging to the same stride. After data strips that belong to a data stride are identified, the maximum number of data strips that can be migrated to the hot spare disk in the data stride is determined based on a data redundancy with which the disk array structure is provided. A further advantage of such a practice is that while the idle storage mediums on the member disk increase, the data recover capability of the disk array is maintained. For RAID 5, when any data strip that forms a data stride is lost, the lost data strip can be recovered from other data strips. However, if two or more data strips that form one data stride are lost, the lost data strips cannot be recovered from the remaining data strips in the data stride. If two or more data strips in the same data stride are migrated to a hot spare disk, once the hot spare disk fails, two or more data strips in the same data stride will be lost, which will affect the data recovery capability of the disk array. In some disk array structures, data strips in a data stride have a larger data redundancy, such that even if two data strips in the same data stride are lost, the lost data strips can also be recovered from the remaining data strips. For example, in RAID 6, when any two data strips that form one data stride are lost, the lost two data strips may be recovered from other data strips. For such a disk array structure, theoretically, at most two data strips in the same data stride may be migrated to the hot spare disk.

Generally, in an actual storage system, one hot spare disk typically corresponds to multiple disk arrays simultaneously. For example, a storage system might have four disk arrays, but only two hot spare disks. Each hot spare disk is combined with four disk arrays, respectively, into a disk array-hot spare disk combination. If the method according to embodiments of the present invention is adopted for each disk array-hot spare disk combination to migrate a part of data strips in the disk arrays to the hot spare disks, then the access times to the hot spare disks might increase excessively, such that the service life of the hot spare disks will be shortened. If the service life of the hot spare disks becomes the same as the member disks, they cannot play the role that should be played by hot spare disks. According to one embodiment of the present invention, cold data strips are migrated into hot spare disks in priority, wherein the "cold data strips" refer to those data strips that are accessed less times. Those skilled in the art may employ various methods, including detecting the current cold data strips and predicting future cold data strips, to determine a cold data strip. These methods will not be described in detail here. The advantage of migrating the cold data strips into hot spare disks lies in reducing access to the hot spare disks. According to another embodiment of the present invention, data strips in a cold data stride are migrated to hot spare disks in priority. The "cold data stride" refers to a data stride in which all data strips are cold data strips. It will be understood that this may further reduce access to the hot spare disks.

As stated above, in a traditional disk array-hot spare disk structure, the hot spare disk does not store data. If a member disk in a disk array fails, then the data originally stored on the failing member disk may be recovered from other member disks, the recovered data is stored in the hot spare disk, and the hot spare disk, together with other member disks, forms a new disk array. After a part of data on the member disk is migrated to the hot spare disk, the hot spare disk also stores the part of data. Below is a description of how to handle hard disk failure in this scenario.

Figure 4:
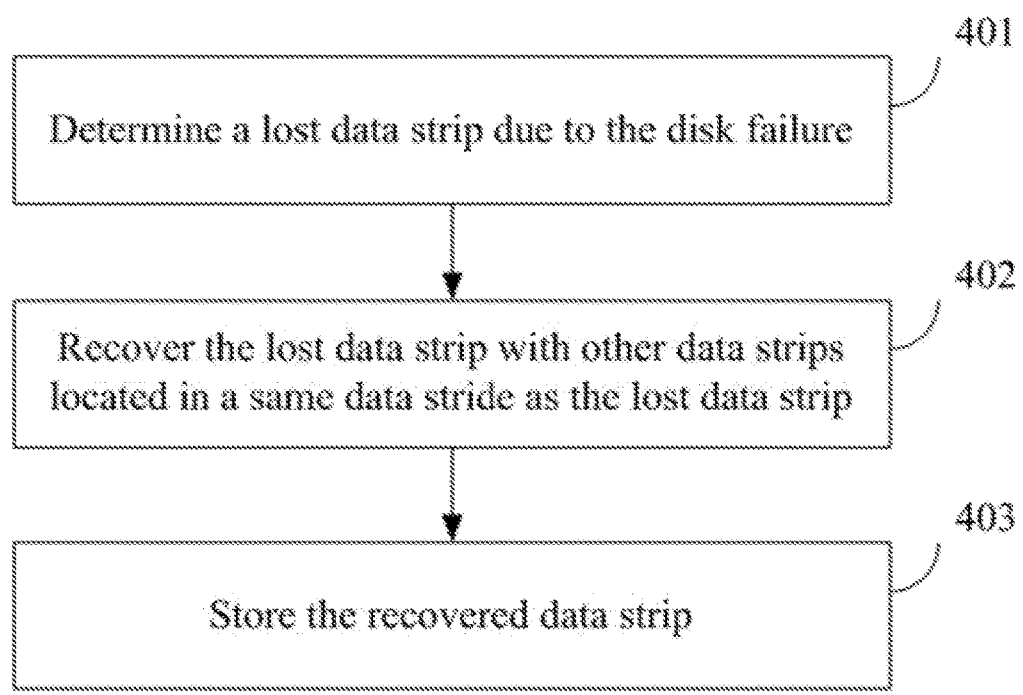
FIG. 4 shows a flow chart of a method for performing storage control upon data rebuild, according to an embodiment of the present invention.

FIG. 4 shows a flow chart of a method for performing storage control upon data rebuild, according to an embodiment of the present invention.

In operation 401, a lost data strip due to hard disk failure is determined.

Figure 5A:
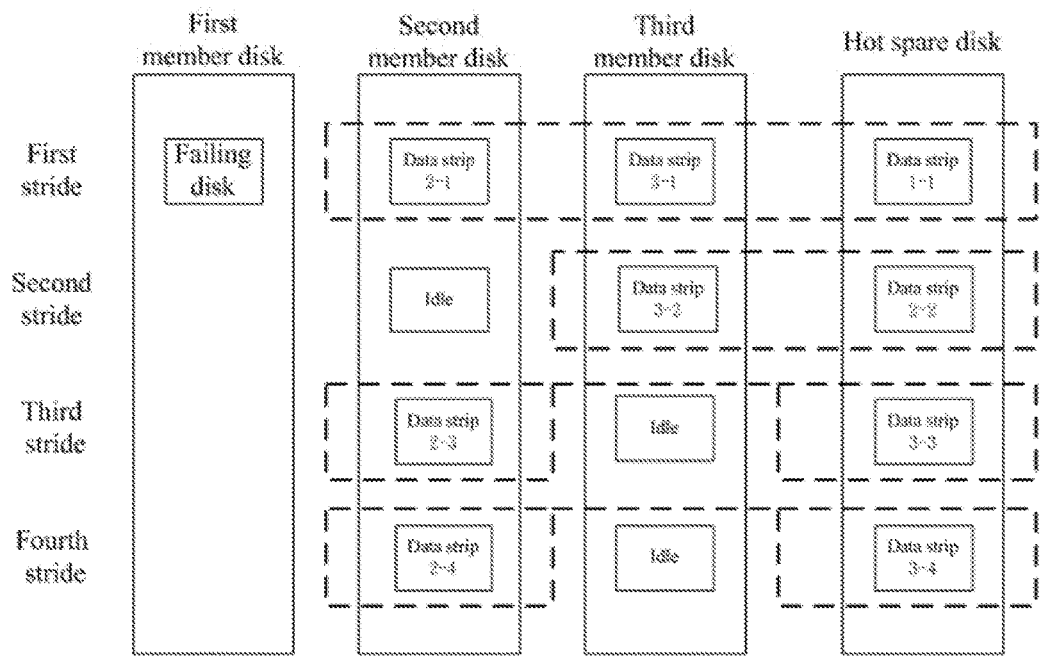
FIGS. 5A, 5B, and 5C are schematic diagrams of a storage system, according to an embodiment of the present invention.

For example, assume that in the storage system after data migration as shown in FIG. 3B, the first member disk fails. In the schematic diagram of the storage system shown in FIG. 5A, data strip 1-1 has been migrated to a hot spare disk; therefore, this data strip is not lost. Data strips 1-2, 1-3 and 1-4 are lost since they are not migrated.

In operation 402, the lost data strips are recovered with other data strips located in the same data stride as the lost data strips. For example, data strips 2-2 and 3-2 remain in the second data stride; data strips 2-3 and 3-3 remain in the third data stride; and data strips 2-4 and 3-4 remain in the fourth data stride. Since data strips in the same data strip have a redundancy, data strip 1-2 may be recovered from data strips 2-2 and 3-2, data strip 1-3 may be recovered from data strips 2-3 and 3-3, and data strip 1-4 may be recovered from data strips 2-4 and 3-4.

In operation 403, the recovered data strip is stored. According to one embodiment of the present invention, the recovered data strip is stored in a hard disk other than the disk where the data strips used for recovering the data are located. As a result, the data redundancy is not affected.

Figure 5B:
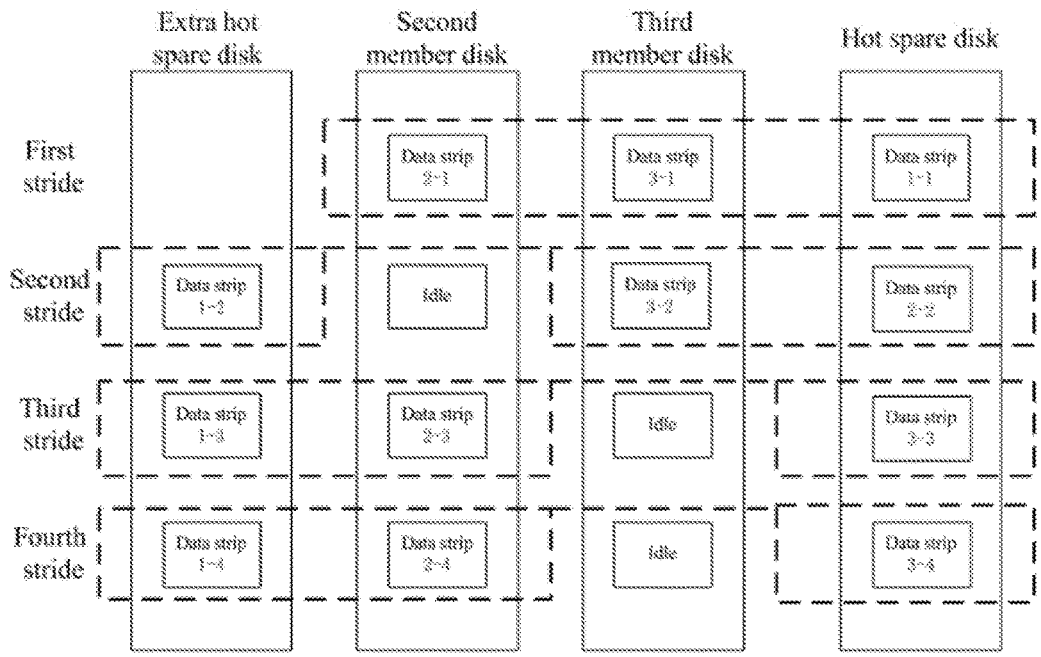

If an extra hot spare disk corresponding to the hard disk array exists, and the extra hot spare disk before data rebuild does not store the data from the disk array, then the recovered data strip may be stored in the extra hot spare disk. The storage system after being subject to data rebuild is shown in FIG. 5B.

Figure 5C:
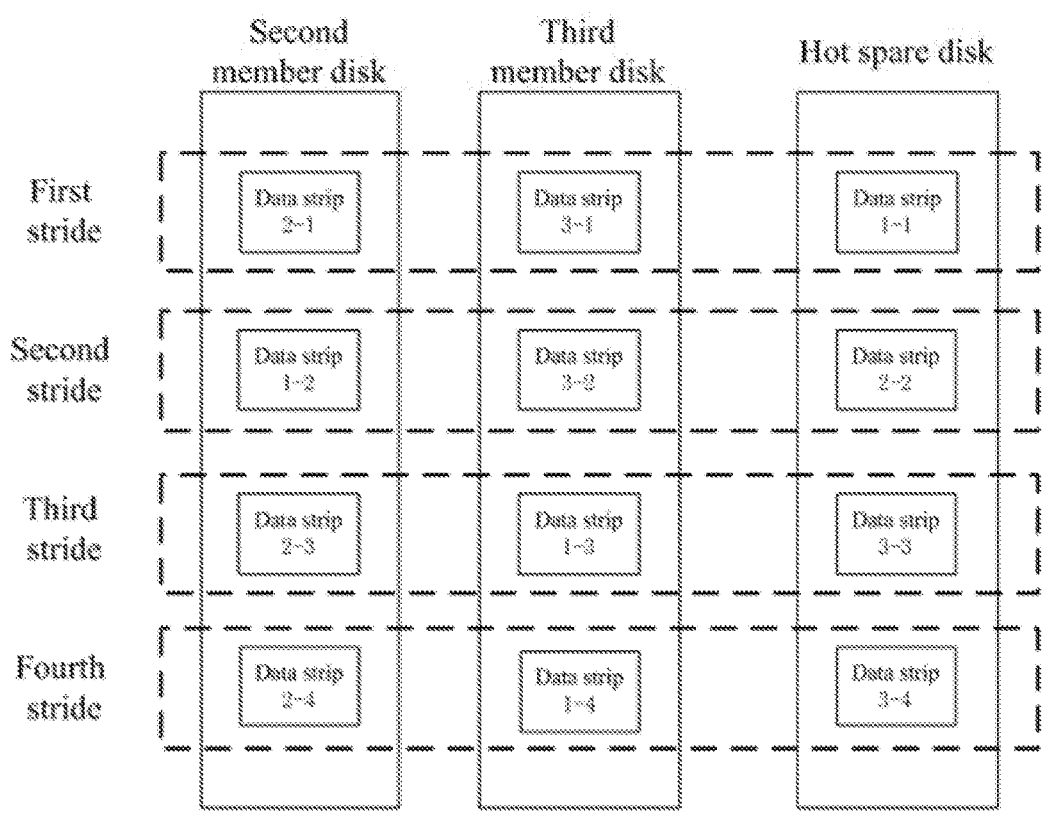

If an extra hot spare disk corresponding to the disk array does not exist, for each stride subject to data recovery, the recovered data strip may be stored in a hard disk that does not participate in data recovery of the stride. The storage system after being subject to data rebuild is shown in FIG. 5C. For example, for a second stride, the hard disks participating in data recovery of the stride are the third member disk and the hot spare disk, the hard disk that does not participate in data recovery of the stride is the second member disk, and the recovered data strip 1-2 is stored on the second member disk.

The above description does not distinguish whether a member disk or a hot spare disk fails. It will be understood with reference to FIG. 3B that in a case where the hot spare disk only corresponds to one disk array, regardless of whether a member disk of the disk array or a hot spare disk fails, the processing may proceed according to operations 401-403.

When a hot spare disk corresponds to a plurality of disk arrays, the hot spare disk might store data from a plurality of disk arrays. In this case, if the hot spare disk fails, operations 401-403 should be performed for each disk array that has data on the hot spare disk. If a member disk in a certain disk array fails, it is only necessary to perform operations 401-403 for a combination of the disk array and the hot spare disk.

Optionally, if a hot spare disk stores data from a plurality of disk arrays, data strips from a disk array where no member disks fail may be reversely migrated to their source member disks, and such a practice has an advantage of reducing access to the hot spare disk. For example, in the above case of having an extra hot spare disk, the extra hot spare disk may already store data from other data arrays before performing the above data rebuild. After performing the above data rebuild, the extra hot spare disk is added with data strips coming from disk arrays where member disks fail. As a result, the access to the extra hot spare disk further increases, such that its service life might be shorted. Performing the above reverse migration may counteract this increase.

An apparatus according to the embodiments of the present invention may be implemented by a computer program running on exemplary computer system/server 12, as shown in FIG. 1. Although FIG. 1 shows a hardware structure of a general computer system, since this computer system runs the computer program, it implements solutions according to embodiments of the present invention, such that the computer system/server 12 becomes an apparatus according to embodiments of the present invention.

Although the apparatus according to the embodiments of the present invention, as a whole, can be implemented by the same general computer system, respective devices or modules forming the apparatus can be regarded as being implemented by separate hardware. The reason is that when running the computer program, the general computer typically implements respective devices or modules in a shared manner, such as time-division or processor core-division. Taking time-division implementation as an example, at a particular moment, the general computer system acts as hardware dedicated for implementing a particular device or module; at different moments, the general computer system acts as different hardware dedicated for implementing a different device or module. Therefore, an apparatus according to embodiments of the present invention can comprise a series of combinations of hardware-implemented devices or modules, rather than only functional module architecture. Alternatively, the apparatus according to embodiments of the present invention may also be understood as an entity device implementing solutions of embodiments of the present invention mainly through hardware.

Figure 6:
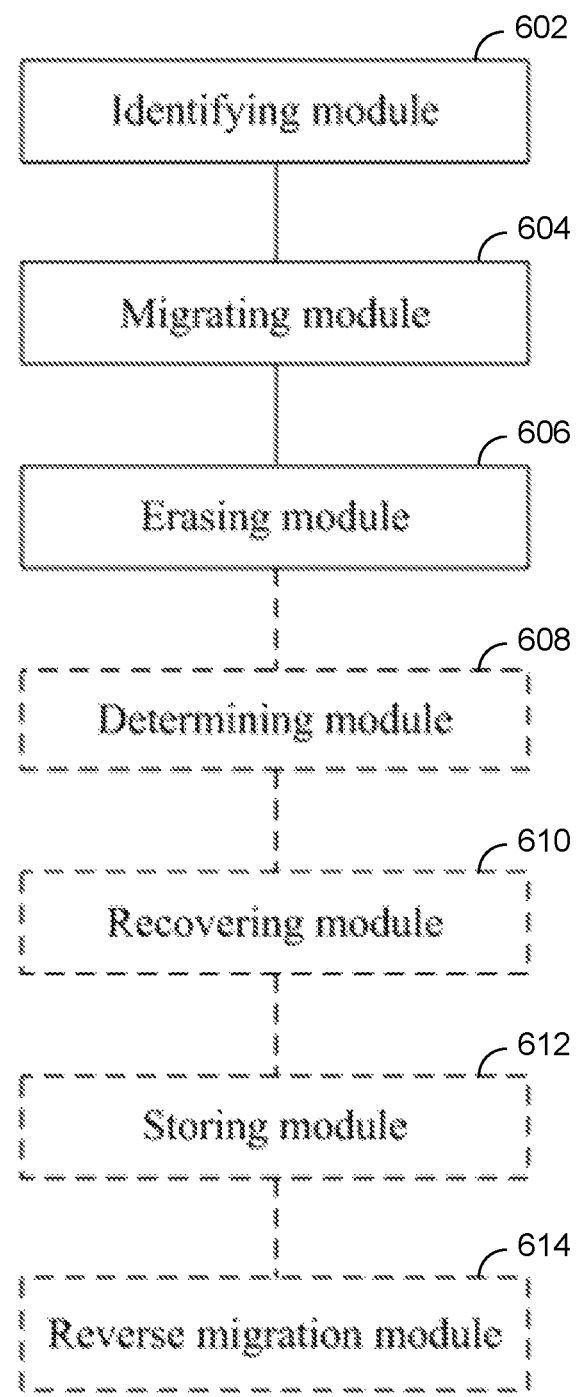
FIG. 6 shows a block diagram of an apparatus for storage control, according to an embodiment of the present invention.

FIG. 6 shows a block diagram of an apparatus for performing storage control, according to an embodiment of the present invention. The apparatus comprises: an identifying module 602 configured to identify member disks and a hot spare disk in a storage system, wherein the member disks are members of a disk array, and the hot spare disk is for joining in the disk array when a member disk fails; a migrating module 604 configured to migrate data on a member disk having a write amplification effect to the hot spare disk; and an erasing module 606 configured to perform, in the member disk having a write amplification effect, an erase operation on a storage medium where the migrated data is located.

Data volumes migrated from respective member disks having a write amplification effect have a smaller variance. Cold data in a member disk having a write amplification effect is migrated to the hot spare disk in priority.

The migrating module comprises: a module configured to identify a data stride in the disk array, wherein the data stride is composed of data strips from respective member disks, and mutual checks are enabled between the data strips; a module configured to determine a maximum number of data strips in the data stride that can be migrated to the hot spare disk based on a data redundancy with which the disk array structure is provided; and a module configured to migrate the determined number of data strips to the hot spare disk.

The apparatus further comprises: a determining module 608 configured to determine a lost data strip due to a disk failure in response to detecting the disk failure; a recovering module 610 configured to recover the lost data strip with other data strips located in a same data stride as the lost data strip; and a storing module 612 configured to store the recovered data strip.

The storing module comprises: a module configured to store the recovered data strip into a hard disk other than a hard disk where the data strips for recovering the data are located.

The apparatus further comprises: a reverse migration module 614 configured to in response to the hot spare disk storing data from member disks of a plurality of disk arrays, reversely migrate data strips of disk arrays without failure of member disks to their originating member disks.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for performing storage control, comprising:
   identifying member storage media and a hot spare storage medium in a storage system, wherein the member storage media are members of a storage medium array, and the hot spare storage medium is for joining in the storage medium array when a member storage medium fails;
   migrating data on a member storage medium having a write amplification effect to the hot spare storage medium, wherein the migrating comprises:
      identifying a data stride in the storage medium array, wherein the data stride is composed of data strips from respective member storage media, and mutual checks are enabled between the data strips;
      determining a maximum number of data strips in the data stride that can be migrated to the hot spare storage medium based on a data redundancy of a structure of the storage medium array; and
      migrating a number of data strips no more than the determined number to the hot spare storage medium; and
   performing, in the member storage medium having a write amplification effect, an erase operation on a storage medium where the migrated data is located.

2. The method according to claim 1, wherein a variance of data volumes migrated from respective member storage media having a write amplification effect is smaller than a variance threshold.

3. The method according to claim 1, wherein cold data in member storage media having a write amplification effect is migrated to the hot spare storage medium in priority.

4. The method according to claim 1, further comprising:
   determining, in response to detecting a storage medium failure, a lost data strip caused by the storage medium failure;
   recovering the lost data strip with other data strips located in a same data stride as the lost data strip; and
   storing the recovered data strip.

5. The method according to claim 4, wherein storing the recovered data strip comprises:
   storing the recovered data strip into a storage medium other than a storage medium where the data strips for recovering data are located.

6. The method according to claim 4, further comprising:
in response to the hot spare storage medium storing data from member storage media of a plurality of storage medium arrays, reversely migrating data strips from storage medium arrays without a failing member storage medium to originating member storage media.

7. An apparatus for performing storage control, comprising:
an identifying module configured to identify member storage media and a hot spare storage medium in a storage system, wherein the member storage media are members of a storage medium array, and the hot spare storage medium is for joining in the storage medium array when a member storage medium fails;
a migrating module configured to migrate data on a member storage medium having a write amplification effect to the hot spare storage medium, wherein the migrating module comprises:
a module configured to identify a data stride in the storage medium array, wherein the data stride is composed of data strips from respective member storage media, and mutual checks are enabled between the data strips;
a module configured to determine a maximum number of data strips in the data stride that can be migrated to the hot spare storage medium based on a data redundancy of a structure of the storage medium array; and
a module configured to migrate a number of data strips no more than the determined number to the hot spare storage medium; and
an erasing module configured to perform, in the member storage medium having a write amplification effect, an erase operation on a storage medium where the migrated data is located.

8. The apparatus according to claim 7, wherein a variance of data volumes migrated from respective member storage media having a write amplification effect is smaller than a variance threshold.

9. The apparatus according to claim 7, wherein cold data in member storage media having a write amplification effect is migrated to the hot spare storage medium in priority.

10. The apparatus according to claim 7, further comprising:
a determining module configured to determine, in response to detecting a storage medium failure, a lost data strip caused by the storage medium failure;
a recovering module configured to recover the lost data strip with other data strips located in a same data stride as the lost data strip; and
a storing module configured to store the recovered data strip.

11. The apparatus according to claim 10, wherein the storing module comprises:
a module configured to store the recovered data strip into a storage medium other than a storage medium where the data strips for recovering data are located.

12. The apparatus according to claim 10, further comprising:
a reverse migration module configured to, in response to the hot spare storage medium storing data from member storage media of a plurality of storage medium arrays, reversely migrate data strips from storage medium arrays without a failing member storage medium to originating member storage media.

13. A computer program product for performing storage control, the computer program product comprising:
one or more computer readable storage media and program instructions stored on the one or more computer readable storage media, the program instructions comprising:
program instructions to identify member storage media and a hot spare storage medium in a storage system, wherein the member storage media are members of a storage medium array, and the hot spare storage medium is for joining in the storage medium array when a member storage medium fails;
program instructions to migrate data on a member storage medium having a write amplification effect to the hot spare storage medium, comprising:
program instructions to identify a data stride in the storage medium array, wherein the data stride is composed of data strips from respective member storage media, and mutual checks are enabled between the data strips;
program instructions to determine a maximum number of data strips in the data stride that can be migrated to the hot spare storage medium based on a data redundancy of a structure of the storage medium array; and
program instructions to migrate a number of data strips no more than the determined number to the hot spare storage medium; and
program instructions to perform, in the member storage medium having a write amplification effect, an erase operation on a storage medium where the migrated data is located.

14. The computer program product according to claim 13, wherein a variance of data volumes migrated from respective member storage media having a write amplification effect is smaller than a variance threshold.

15. The computer program product according to claim 13, wherein cold data in member storage media having a write amplification effect is migrated to the hot spare storage medium in priority.

16. The computer program product according to claim 13, wherein the program instructions stored on the one or more computer readable storage media further comprise:
program instructions to determine, in response to detecting a storage medium failure, a lost data strip caused by the storage medium failure;
program instructions to recover the lost data strip with other data strips located in a same data stride as the lost data strip; and
program instructions to store the recovered data strip.

17. The computer program product according to claim 16, wherein the program instructions stored on the one or more computer readable storage media further comprise:
program instructions to, in response to the hot spare storage medium storing data from member storage media of a plurality of storage medium arrays, reversely migrate data strips from storage medium arrays without a failing member storage medium to originating member storage media.

18. The computer program product according to claim 16, wherein the program instructions to store the recovered data strip comprise:
program instructions to store the recovered data strip into a storage medium other than a storage medium where the data strips for recovering data are located.

* * * * *